Patented Aug. 21, 1934

1,970,701

UNITED STATES PATENT OFFICE 1,970,701

SELECTIVE AGENT FOR MINERAL RECOVERY

George D. Kratz, Scarsdale, N. Y., assignor to Benjamin Briscoe, New York, N. Y.

No Drawing. Application May 16, 1932, Serial No. 611,641

6 Claims. (Cl. 252—9)

This invention relates to an improved composition of matter and an improved method for the concentration of ores and more particularly to the provision of an improved composition and improved method adapted for the segregation of metallic particles from black sands and the valueless earthy or rocky gangue with which such metallic particles are associated.

One object of the present invention resides in the provision of a composition of matter having characteristics which are particularly adapted to cause particles of certain metals to adhere thereto, which characteristics also substantially prohibit the retention of black sands and earthy or rocky gangues in the composition.

A further object of the present invention resides in the provision of a metal receiving and retaining composition having improved surface characteristics for the composition whereby the composition will retain the desired metallic particles while substantially repelling the collection and retention of a coating of black sand or gangue on the composition, which latter coating would hinder the desired retention of metallic particles.

A further object of the present invention resides in an improved method for recovering metallic particles wherein provision is made for varying the composition to afford desired variable plasticity of the composition in accordance with the size of the metallic particles to be retained thereon and in accordance with the temperature of the water used in the recovery of metallic particles from ores, placer deposits, etc.

Further and other objects of the invention reside in the provision of a novel method and series of compositions for recovering metals which are adapted to effect better recoveries than heretofore.

According to the present invention a selective material or composition is provided, which material has properties which are adapted for retaining metallic particles therein and which composition rejects and repels black sands, earthy, rocky, silicious or other valueless gangues, etc. A preferred selective composition comprises a mixture of medium oxidized sulphur saturated asphalt, (which is asphalt with sulphur mixed and combined therewith so that the asphalt is saturated with sulphur but not containing an excess of uncombined sulphur or sulphur in the free state, the material is oxidized to a medium extent so as to have a medium degree of hardness and melt at 180° F., such a substance is also known as "mineral rubber". The material may be oxidized in any desired manner as by blowing with air, see Asphalt & Allied Substances by Abraham, pp. 287 to 295), a hydrogenated vegetable oil, a solvent and a metal selective constituent such as halide substituted phenol such as mono-chlorphenol or the like. More particularly the selective composition comprises a medium oxidized sulphur saturated asphalt having a melting point of approximately 180° F. when determined by what is known as the "ring and ball method". A suitable hydrogenated vegetable oil which is found satisfactory for use in the selective composition is one with the following physical characteristics: melting point 40° C.; specific gravity 0.922; flash point 345° C.; fire point 340° C. The chemical composition of this hydrogenated vegetable oil is approximately as follows: solid saturated fatty acids 30%; oleic acid 50%; iso-oleic acid 15%; and linolic acid 5%. Such oil should contain both oleic and stearic glycerides. Ordinary commercial tetrachloride has been found to be a suitable solvent for the asphalt and the oil and which solvent acts as a softener for the asphalt. A halide substituted phenol, preferably monochlor-phenol, has been found useful as a selective constituent in the separation of gold.

Specifically the composition is made in the following manner. The medium oxidized sulphur saturated asphalt is heated until melted and until it is quite liquid. The hydrogenated vegetable oil is also heated until liquid and then poured into the medium oxidized sulphur saturated asphalt and stirred therein until a well mixed solution or mixture is obtained. This mixture is allowed to cool until the first signs of solidification appear in the mixture. At this time the halide substituted phenol, preferably mono-chlor-phenol, is well stirred into the mixture. The mixture is then cooled slightly below 80° C. and the carbon tetrachloride is stirred slowly into the mixture until the entire mass is homogeneous. It is then allowed to cool and is ready for use.

The composition can be used in various ways, one manner of its use is to apply a coating of it to the panning surface of an ordinary miner's or prospector's pan. The composition is heated and poured into the pan to a depth of about ⅛". The mixture is then cooled until the composition becomes a semi-solid or sticky solid mass. Care should be taken to maintain so far as possible, a smooth even surface on the composition while it is being cooled so as to provide a mirror-like brightness for the surface of the composition in the pan. The pan is then filled with water and a mixture of ore containing silicious gangue, black sand and gold particles or placer deposits containing gold in water is poured into the pan. The panning procedure is then carried out in the usual way and when the panning operation is completed it will be found that the gold will have adhered to the composition, whereas little or no black sand or silicious or earthy gangue has remained behind.

In lieu of utilizing the composition in a prospector's pan the composition may be utilized in other ways. It may be applied to the surface of sluices, concentrators, settling tanks or to surfaces of any device wherein native metal such as gold, may be separated from sand or gangue by the use of water or other liquid. Preferably, instead of applying the composition directly to the surface of a sluice or concentrator, it is found economical to apply the composition to fabric or other material which may be readily removed when the operation is finished. By applying the composition to removable fabric sheets provision is afforded for the immediate substitution of other material prepared in the same manner whereby a quick resumption of operations may be secured.

The composition also may be utilized in recovering fine gold from froth. For example, one or both sides of a heavy fabric material may be covered with composition, such composition having a rather stiff consistency as will be hereinafter set forth. The coated prepared sheets are then suspended at various points where froth formation occurs and are disposed in such relation that they receive the greatest possible amount of froth and spray. It has been found that much of the fine gold carried by the froth adheres to the composition and may be collected in this manner.

After the gold or other valuable metal has been entrapped in the composition it may be recovered therefrom by burning the composition. The gold or other valuable metallic particles may also be recovered from the composition by dissolving out the soluble constituents of the composition in a suitable solvent such as carbon tetrachloride. The fine gold will then be left behind as a sediment and if desired the solvent can be recovered by distillation methods.

As an illustration of the desired proportions of the different constituents of the composition the following two mixtures have been found useful in separating virgin gold from placer sands which contain a high percentage of black sand in addition to silicious gangue.

|  | A | B |
|---|---|---|
| Medium oxidized sulphur saturated asphalt. | 5 oz. (wt.) | 5 oz. (wt.). |
| Hydrogenated vegetable oil | 2 oz. (wt.) | 4 oz. (wt.). |
| Carbon tetrachloride | 1 oz. (liq.) | 1 oz. (liq.). |
| Mono-chlor-phenol | 1/15 oz. (wt.) | 1/15 oz. (wt). |

The consistency of composition A set forth above is considerably stiffer than that of composition B.

In the practice of the use of the method, it has been found that small particles of gold such as are seen with difficulty by the naked eye adhere to composition A, whereas the heavy particles may require a softer, stickier and more plastic mixture such as that represented by composition B. In some cases it may be desirable to use both the soft and the heavy composition as will be readily understood. One surface may be coated with the softer composition B to entrap the larger particles and another surface may be coated with the A composition to collect the smaller particles.

It has also been found that the consistency of the composition which is to be used should depend upon the temperature of the water or other liquid which is to be used with the recovery operations, that is for best results the consistency of the composition should be varied so as to compensate for the temperature of the water or other liquid. For example, where an exceptionally warm water is used in the recovery operations, a mixture of type C may be required, whereas for a very cold water, that of type D may produce the best results. Compositions C and D have constituents in the proportions substantially as follows:

|  | C | D |
|---|---|---|
| Medium oxidized sulphur saturated asphalt. | 5 oz. (wt.) | 5 oz. (wt.). |
| Hydrogenated vegetable oil | 1 oz. (wt.) | 5 oz. (wt.). |
| Carbon tetrachloride | 1 oz. (liq.) | 1 oz. (liq.). |
| Mono-chlor-phenol | 1/15 oz. (wt.) | 1/15 oz. (wt.). |

Typical composition C is of a rather stiff consistency and typical composition D is quite soft at temperatures from 60° to 70° F. At higher temperatures but below 100° F. typical composition C becomes of the desired consistency and at lower temperatures, but above 32° F. type D serves the purpose of recovering the desired metal.

In the above illustrative compositions the consistency has been altered by varying the amount of hydrogenated vegetable oil in the mixture, but the same end may be secured by varying the amount of carbon tetrachloride or by using a medium oxidized sulphur saturated asphalt of a different melting point.

In the foregoing explanation it has been explained how the composition is used for separating gold from placer ores. However, the composition can also be used on any gold ore where the metal appears in native form. The composition and method are also applicable for the separation of platinum and other metals which are found in the native and virgin form. In certain instances the composition is also adaptable for the separation of metals which are in chemical combination with other substances.

Summarizing, according to the present invention, in the use of the composition, it is preferable to vary the consistency of the composition in accordance with factors which are encountered in the recovery operations. First, where the particles of metal to be recovered are small relatively stiffer compositions should be used than where the particles to be recovered are of relatively larger size, which larger particles require relatively softer compositions. Where the wash water or other liquid is relatively warm, relatively stiffer compositions are preferably used and where the wash water or other liquid is relatively cold relatively softer and more plastic compositions should be used.

In the practical use of the compositions the asphalt material if used alone is too hard and not sticky enough to properly receive and retain the metallic particles. The hydrogenated vegetable oil, if used alone, is too soft and the gangues in place of being rejected and repelled sink into and adhere to such material. With hydrogenated vegetable oil and asphalt used together the resulting composition has certain of the desired metal retaining properties and the gangue repelling properties as well. This mixture can be used alone, but the addition of a solvent thereto increases the stickiness of the composition and also seems to cooperate to provide a mirror-like surface which assists in repelling the gangue. While carbon tetrachloride is the preferred solvent, other solvents can be used such as gasoline. Gasoline, however, evaporates more rapidly and tetrachloride seems superior to gasoline in improving the characteristics of the product. The metal selective agent in some cases may be dispensed with but its use in the mixture seems to improve the recovery.

What I claim is:

1. A selective agent for use in recovering metals comprising an asphalt, a hydrogenated vegetable oil, a solvent for the asphalt acting as a softener therefor and a metal selective constituent comprising a halide substituted phenol.

2. The invention set forth in claim 1 in which the halide substituted phenol comprises mono-chlor-phenol.

3. The invention set forth in claim 1 in which the solvent comprises carbon tetrachloride.

4. A selective agent for use in recovering metals and for repelling valueless gangues comprising a mixture of medium oxidized sulphur saturated asphalt, a hydrogenated vegetable oil, a carbon tetrachloride solvent and mono-chlor-phenol as a metal selective constituent.

5. A selective composition for use in recovering metallic particles and adapted to repel worthless gangues comprising a mixture of medium oxidized sulphur saturated asphalt and a hydrogenated vegetable oil.

6. The invention set forth in claim 5 in which a solvent is included for increasing the stickiness of the mixture.

GEORGE D. KRATZ.